United States Patent [19]
Ojima

[11] 4,424,675
[45] Jan. 10, 1984

[54] TURBOCHARGER CONTROL SYSTEM FOR USE IN INTERNAL COMBUSTION ENGINES

[75] Inventor: Kazuo Ojima, Katsuta, Japan
[73] Assignee: Hitachi, Ltd., Tokyo, Japan
[21] Appl. No.: 277,864
[22] Filed: Jun. 26, 1981
[30] Foreign Application Priority Data
  Jul. 4, 1980 [JP] Japan ................ 55-90607
[51] Int. Cl.³ ........................... F02B 37/12
[52] U.S. Cl. ................................ 60/602
[58] Field of Search ............ 60/600, 601, 602, 603, 60/611; 123/564

[56] References Cited
U.S. PATENT DOCUMENTS

| | | | |
|---|---|---|---|
| 3,195,805 | 7/1965 | Cholviu et al. | 60/602 X |
| 3,257,796 | 6/1966 | Updike | 60/602 |
| 4,203,296 | 5/1980 | Tanaka et al. | 60/602 |
| 4,271,672 | 6/1981 | Withalm et al. | 60/602 |
| 4,282,713 | 8/1981 | Antoku et al. | 60/600 |

*Primary Examiner*—Michael Koczo
*Attorney, Agent, or Firm*—Antonelli, Terry & Wands

[57] ABSTRACT

A control system for a turbocharger of an internal combustion engine, with the control system adapted to control a turbocharger having a turbine bypass valve in dependence upon a differential pressure between a turbo charging pressure supplied to a first pressure chamber and an atmospheric pressure supplied to a second pressure chamber. A pressure detecting device detects the turbocharging pressure, and pressure control valves shift the atmospheric pressure into the first pressure chamber of the pressure device and the pressure existing between a throttle valve of the engine and the compressor of the turbocharger in the second pressure chamber thereof, when the turbocharging pressure is less than a preset value.

16 Claims, 7 Drawing Figures

TURBOCHARGER CONTROL SYSTEM FOR USE IN INTERNAL COMBUSTION ENGINES

The present invention relates to an internal combustion engine and, more particularly, to a turbocharged internal combustion engine having a control system for controlling an actuation of the turbocharger, which control system controls a turbine bypass valve thereof.

In recent times various internal combustion engines having turbochargers have been proposed, and a turbocharged engine for use in a passenger motor vehicle has been developed. Such turbocharged engines generally include a turbine bypass valve for controlling an actuation of the turbocharger so as to obtain higher turbocharging efficiency.

A control system is provided for the turbocharger in order to protect the machine from breakdown due to an extraordinary increase in turbocharging pressure. The control system generally actuates a pressure device cooperating with the turbine bypass valve in response to a turbocharging pressure, that is, the pressure existing in an intake air passage or conduit for the compressor of a turbocharger to an intake manifold of the engine.

Generally, pressure devices have been proposed which include a diaphragm and a spring, with the pressure device being adapted to actuate the turbine bypass valve in an opening direction when the turbocharging pressure is above the desired positive pressure. Consequently, in a region where the turbocharging pressure is below a desired pressure, as would be the case under normal operating conditions or deceleration of the engine, the bypass valve maintains the bypass passage closed. However, the turbocharging pressure is also low in a region of operation wherein the rotational speed of the engine is low; therefore, in such a situation, the charging effect of the turbocharged engine cannot be obtained. On the contrary, a turbine of the turbocharger results in an engine loss factor by resisting a discharge of the exhaust gases. The actuation of the turbocharger under a deceleration condition is not preferable because it delays the deceleration against the will of a driver of a vehicle.

However, it is impossible to control the bypass valve in a region wherein the turbocharging pressure is low or under deceleration conditions by means of previously proposed simple constructed pressure devices, in which always the turbine charging pressure operates on a side of a diaphragm and the atmospheric pressure operates on the outer side thereof.

Although there have been a number of proposed pressure devices such as, for example, of the type disclosed in Japanese Patent Laid Open Application No. 54-137513 (filed on Apr. 18, 1978) such pressure devices with various switches and actuators are combined in order to expand an operating region thereof; however, a disadvantage of these proposed pressure devices resides in the fact that they are complicated in construction and of very little utility.

The aim underlying the present invention essentially resides in providing a turbocharger control system for an internal combustion engine wherein a rotation of the turbocharger is controlled by the actuation of a bypass valve even in a region or zone where the engine load is relatively low or the engine is under deceleration condition.

In accordance with advantageous features of the present invention, a turbocharger control system for an internal combustion engine includes a turbocharger having a compressor installed between a throttle valve and an intake manifold of the engine, with a turbine installed in an exhaust line or pipe of the engine and a turbine bypass valve for controlling the speed of the turbine. A pressure device is mechanically connected to the turbine bypass valve for enabling an actuation thereof, with the pressure device having a first and second pressure chamber separated by a diaphragm. The first pressure chamber of the pressure device is supplied with a turbocharging pressure existing between a compressor of the turbocharger and the intake manifold, with the second pressure chamber being supplied with atmospheric pressure. A pressure detecting means detects the turbocharging pressure existing between the compressor and the intake manifold and compares the detected pressure to a preset or desired value. A pressure control means is provided for applying atmospheric pressure to the first pressure chamber of the pressure device. The pressure existing between the throttle valve and the compressor as supplied to the second pressure chamber depending upon an output from the pressure detecting means, when the turbocharging pressure is less than the preset or desired value.

By virtue of the above noted features of the present invention, one pressure chamber of the pressure device, having a diaphragm, is subjected to or acted upon by the turbocharging pressure existing between the exit of the compressor and the engine or the atmospheric pressure, with the other pressure being acted upon by an atmospheric pressure or an inlet pressure of the compressor existing between a downstream portion of the throttle valve and the inlet of the compressor, selectively, thereby opening and closing the turbine bypass valve in a region wherein the turbocharging pressure is low as well as in a region wherein the turbocharging pressure is high. In accordance with further advantageous features of the present invention, the preset or desired value of the pressure detecting means for detecting the turbocharging pressure lies within a range of about between 0 and 280 mmHg.

The pressure control means of the control system of the present invention may take the form of either a three way shift valve or a five way shift valve. Preferably, each shift valve is in the form of a magnetic valve including a coil.

Moreover, the pressure detecting means may include a diaphragm which is adapted to cooperate with an electric switching element.

Accordingly, it is an object of the present invention to provide a turbocharger control system for use with an internal combustion engine which avoids, by simple means, shortcomings and disadvantages encountered in the prior art.

Another object of the present invention resides in providing a turbocharger control system for use with internal combustion engines which enables a control of the operation of the turbocharger in a range or area wherein heretofore no control has been carried out.

Yet another object of the present invention resides in providing a turbocharger control system for use with internal combustion engines which is simple in construction and therefore relatively inexpensive to manufacture.

A further object of the present invention resides in providing a turbocharger control system for use with internal combustion engines which enables an opening of a bypass valve of the turbocharger under both acceleration and deceleration conditions of the engine as well as in a region wherein the engine is operated under low load conditions.

Yet another object of the present invention resides in providing a turbocharger control system for use in internal combustion engines which improves the overall fuel consumption of the engine as well as decreases engine losses.

A further object of the present invention resides in providing a turbocharger control system for use in internal combustion engines which significantly improves acceleration and deceleration characteristics of the engine.

These and other objects, features, and advantages of the present invention will become more apparent from the following description when taken in connection with the accompanying drawing which shows, for the purposes of illustration only, several embodiments in accordance with the present invention, and wherein:

Figure 1:
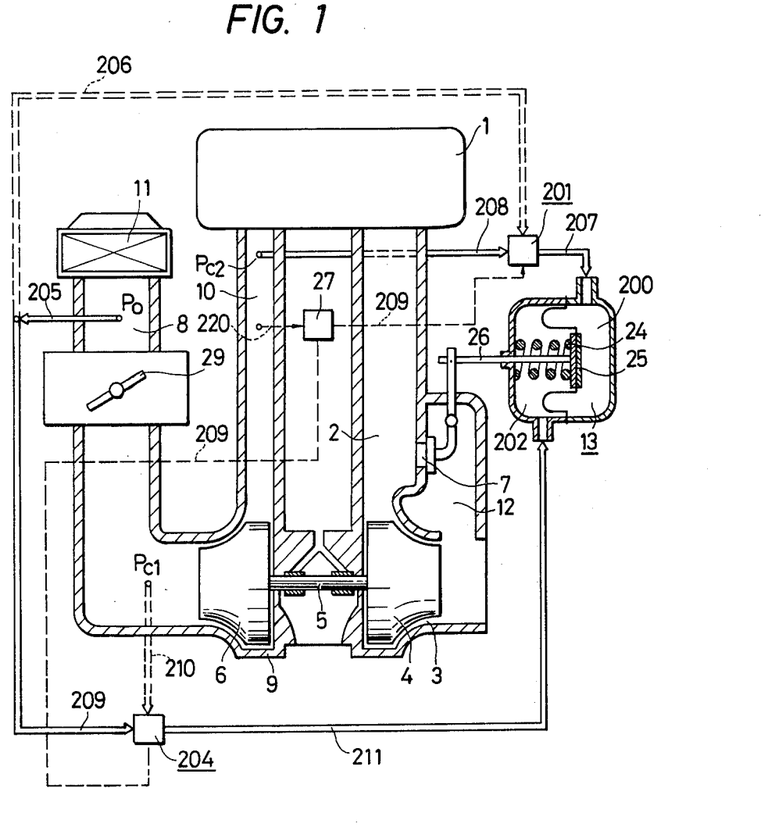
FIG. 1 is a partially schematic cross sectional view of a first embodiment of a turbocharged internal combustion engine equipped with a turbocharger control system in accordance with the present invention.

Referring now to the drawings wherein like reference numerals are used throughout the various view to designate like parts and, more particularly, to FIG. 1, according to this figure, exhaust gas discharged from an engine 1 passes through an exhaust pipe or line 2 and is fed into a turbine housing or casing 3. A turbine 4 is arranged in the turbine housing 3 so that exhaust gas is released to the outside through a muffler thereby driving the turbine in dependence upon a driving condition of the engine. A compressor 4 is accommodated in a compressor case or housing 9, with the compressor 6 being mounted on the same axle or shaft 5 on which the turbine 4 is mounted so that both the turbine 4, and compressor 6 form an operating unit.

Intake air is drawn in through an air cleaner 11 and is mixed with fuel within a carburetor 8 in a conventional manner, with the fuel-air mixture then be introduced into the compressor housing 9. The compressed fuel-air mixture is then supplied through an air intake passage 10 and an intake manifold of the engine 1 and fed to the respective cylinders of the engine under pressure. A bypass passage 12 is provided for bypassing the turbine housing 3. The bypass passage 12 enables exhaust gases from the engine 1 to bypass the turbine 4. A turbine bypass valve 7 is provided for controlling a turbocharging pressure produced by the turbocharger, that is, an opening and closing of the bypass passage 12 is controlled in dependence upon a function of a pressure device 13.

The pressure device 13 controls an opening angle of the bypass valve 7 constructed, for example, as a flap valve. The pressure device 13 includes a housing having a diaphragm 25 arranged therein so as to divide the housing into a first pressure chamber 200 and a second pressure chamber 202, with a spring 24, accommodated in the pressure chamber 202, being adapted to act upon or bias the diaphragm 25.

A control shift valve 201 is adapted to subject the first pressure chamber 200 either to atmospheric pressure $P_o$ from a position downstream of the air cleaner 11 or a pressure in the intake air passage 10 disposed between the compressor 6 and cylinders of the engine, i.e., a turbocharging pressure $P_{C2}$. For this purpose, tubes or conduits 205, 206, 207 and 208 are provided for leading the respective pressures $P_0$, $P_{C2}$ to the control shift valve 201 and first pressure chamber 200. A further control shift valve 204 is provided and is adapted to subject the second pressure chamber 202 of the pressure device 13 either to the atmospheric pressure $P_0$ or a pressure existing between a throttle valve 29 and the compressor 6, that is, the compressor inlet pressure $P_{C1}$. For this purpose, additional tubes or conduits 209, 210, and 211 are provided for enabling the respective pressures $P_0$, $P_{C1}$ to be fed to the control shift valve 204 and second pressure chamber 202 of the control device 13. When the difference between the pressure operating on both sides of the diaphragm 25 is greater than a pressure $P_A$, which pressure $P_A$ is preset by the force of the spring 24, a rod 26 is pushed to the left of FIG. 1 to cause an opening of the bypass valve 7. The control shift valves 201, 204, to which the respective pressures $P_0$, $P_{C2}$, or $P_O$, $P_{C1}$ are fed, perform desired pressure shifting operations upon detection of output signals from a pressure detection device 27.

Figure 7:
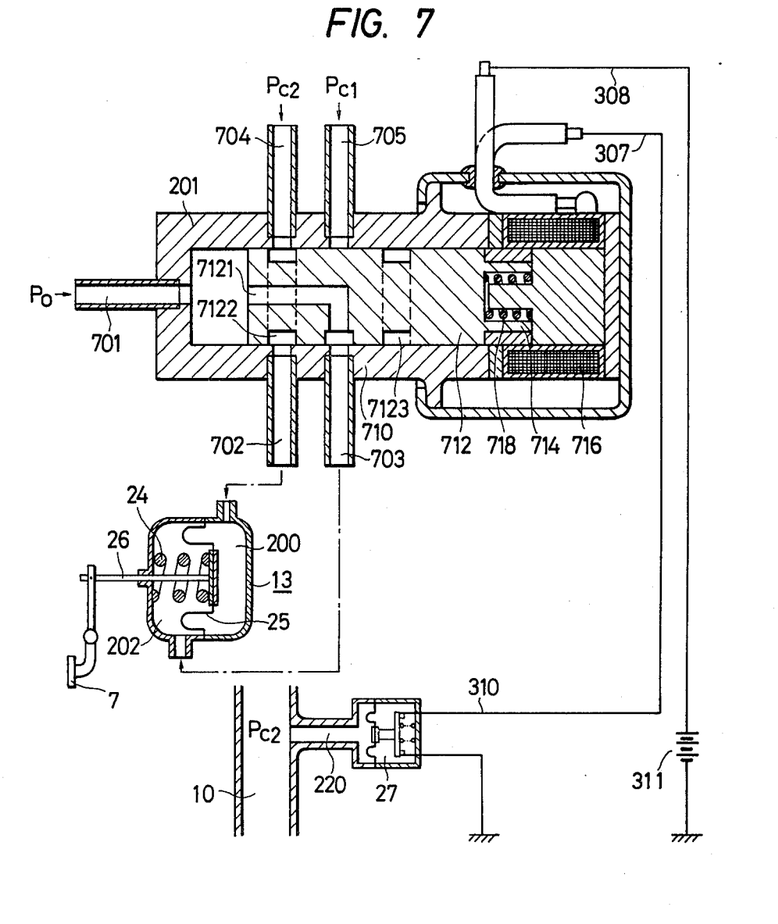
FIG. 7 is a partially schematic cross sectional view of another embodiment of a shift control valve for a turbocharger control system constructed in accordance with the present invention.

The pressure detection device 27 in the construction of FIG. 1 may be of conventional construction and, for example, as shown in FIG. 7, the pressure detection device 27 may include a diaphragm upon which the turbocharging pressure $P_{C2}$ and atmospheric pressure operate with the diaphragm operating with a contact switch.

Figure 2:
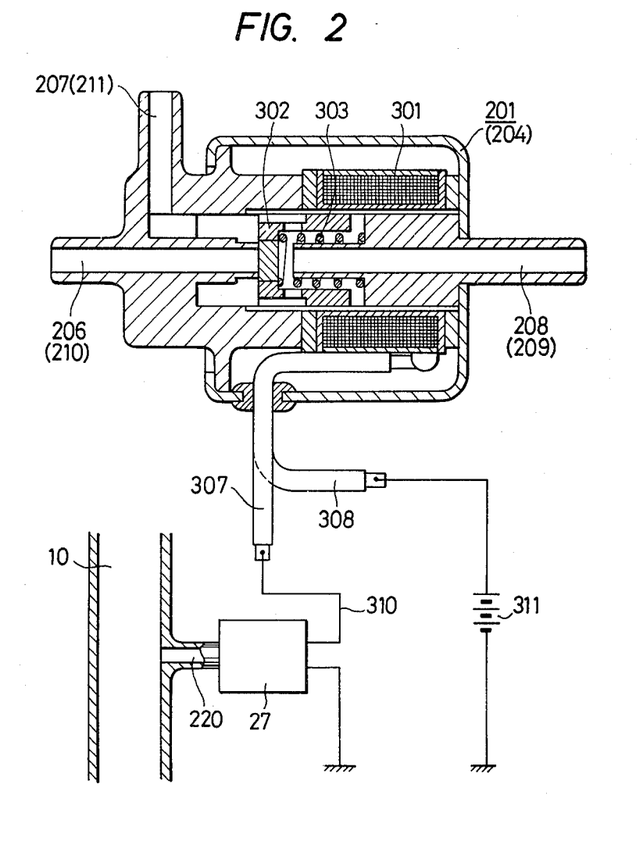
FIG. 2 is a cross sectional detailed view of a shift control valve for the control system of FIG. 1.

As shown in FIG. 2, the control valves 201, and 204 may, for example, be constructed as three way valves which include a coil 301, a valve portion 302, a spring 303, a first pressure inlet 208/209, a pressure outlet 207/211, a further pressure inlet 206/210, and lead lines 307, 308 connected to an output terminal of the pressure detection device 27 and an electrical source 311, respectively.

In operation, the pressure detection device 27 is supplied with the pressure $P_{C2}$ in the intake air passage 10 and therefore performs a switching operation at a desired preset pressure. Accordingly, the on-off operation of the pressure detection device 27 controls an excitation of the coil 301 through the leads 307 and 308, and the valve portion 302 transfers the pressure from the respective pressure inlets 206, 208 to the pressure outlet 207.

Under a heavy load, sufficient exhaust gas is discharged from the engine 1 to drive the turbine 4 at a high speed so as to increase the turbocharging pressure $P_{C2}$. The turbocharging pressure $P_{C2}$ is fed to the first pressure chamber 200 of the pressure device 13 through the tubes 208, the control shift valve 201, and tube 207. At this time, the second pressure chamber 202 of the pressure device 13 is subjected to atmospheric pressure $P_O$ through the tubes 205, 209, control shift valve 204, and tube 211. Accordingly, when the turbocharging pressure $P_{C2}$ reaches the preset or desirable pressure $P_A$, the bypass valve opens to prevent further increases in the speed of the turbine thereby avoiding excessive increases in the turbocharging pressure $P_{C2}$.

Under a low load operating condition of the engine, in which the turbocharging pressure $P_{C2}$ is lower than the preset pressure $P_A$, the positions of the control valves 201 and 204 are exchanged or switched by the detection device 27, and pressures are fed to the pressure chambers 200, 202 of the pressure device 13 which are different from those during the period in which the exhaust gas from the engine 1 bypasses through the bypass passage 12. More particularly, in the low load operation condition, the forced pressure chamber 200 is subjected to atmospheric pressure $P_O$ at a position upstream of the throttle valve 29 through tubes 205, 206, control shift valve 201, and tube 207, while the second pressure chamber 202 of the pressure device 13 is subjected to the compressor inlet pressure $P_{C1}$ through tubes 210, control shift valve 204, and tube 211. Normally the compressor inlet pressure $P_{C1}$ is a negative pressure or vacuum; therefore, the bypass valve 7 is actuated to open through the movement of the diaphragm 25. During idling and low speed operation of the engine 1, during which operation the turbocharging effect is negligible, a discharge loss is diminished by opening the exhaust bypass valve 7 widely for the exhaust gas to detour or bypass the turbine 4. In particular, under acceleration and deceleration operating conditions of the engine 1, when the pressure $P_{C1}$ at the compressor inlet fluctuates depending upon the opening angle of the throttle valve 29, the exhaust bypass valve 7 performs the desired operation responding thereto. Accordingly, by setting the pressure at an appropriate value to which the detection device 27 responds in detecting the turbocharging pressure $P_{C2}$ through a conduit 220 in controlling a positioning of the control shift valves 201 and 204, a turbocharged internal combustion engine is realized in which the turbine bypass valve 7 controls the exhaust bypassing operation under low speed conditions, as well as acceleration and deceleration conditions which are beyond the region conventionally controlled by previously proposed control systems.

Figure 3:
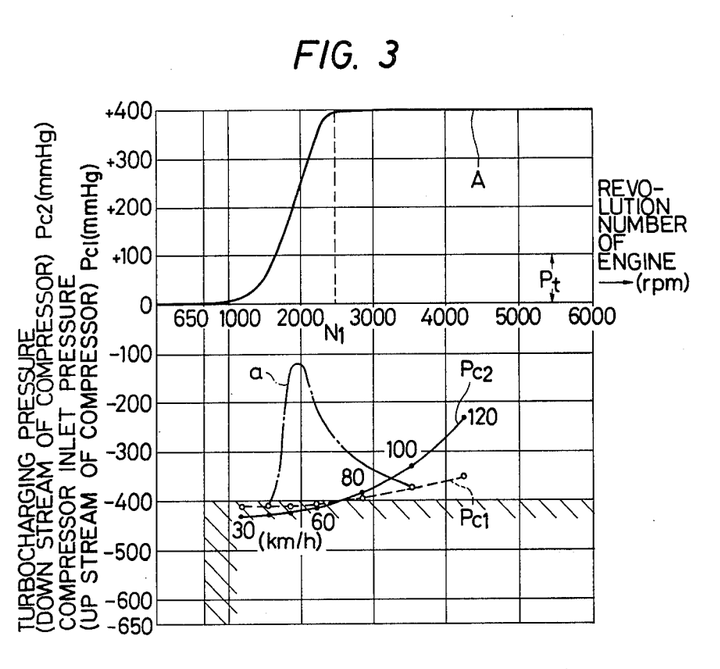
FIG. 3 is a diagrammatic illustration depicting a control characteristic of a shift control valve of FIG. 2 under road loading conditions.

FIG. 3 provides an illustration of a relationship between the rotational speed N of the engine 1 and the compressor inlet pressure $P_{C1}$. The pressure in an area between the throttle valve 29 and the compressor 6, that is, the compressor inlet pressure $P_{C1}$, fluctuates within the vacuum below zero (0 mmHg). In the area between the compressor 6 and the intake manifold, that is, the turbocharging pressure $P_{C2}$, fluctuates over a region of positive and negative pressures. In the illustration of FIG. 3, the curve designated by the reference character A shows an upper limit of the turbocharging pressure $P_{C2}$, in which the turbocharging pressure $P_{C2}$ is inhibited or prevented from exceeding 400 mm Hg within the region wherein the rotational speed N of the engine 1 is greater than $N_1$. As noted hereinabove, the characteristic A may be realized by opening the bypass valve 7.

The pressure detection device 27 operates at a pressure $P_t$ which is lower than 400 mmHg, for example, a pressure of 100 mmHg, with the pressure detection device 27 being adapted to actuate the control shift valves 201 and 204. When the pressure $P_{C2}$ in the conduit 220 is less than the value of the pressure $P_t$, the atmospheric pressure $P_O$ is fed through the tube 206, control shift valve 201, and tube 207 into the first pressure chamber 200, and the compressor inlet pressure $P_{C1}$ is fed through tubes 210, control shift valve 204, and tube 211 into the second pressure chamber 202. Accordingly, in the shaded region in FIG. 3, wherein the compressor inlet pressure $P_{C1}$ is below $-400$ mmHg, the bypass valve 7 is opened and thereby the turbine 4 is protected from being driven unnecessarily. If the engine 1 is hastily accelerated from the speed of 40 km/h, the compressor inlet pressure $P_{C1}$ changes or varies as indicated by the curve designated by the reference a in FIG. 3, that is, the vacuum rises above $-400$ mmHg. Thereby, the bypass valve 7 is closed and the acceleration performance of the engine 1 is improved. On the contrary, during operation of the engine 1 under a condition in which the compressor inlet pressure $P_{C1}$ is above $-400$ mmHg, if a rapid deceleration is carried out, the pressure $P_{C1}$ temporarily falls below a $-400$ mmHg thereby opening the bypass valve 7.

Figure 4:
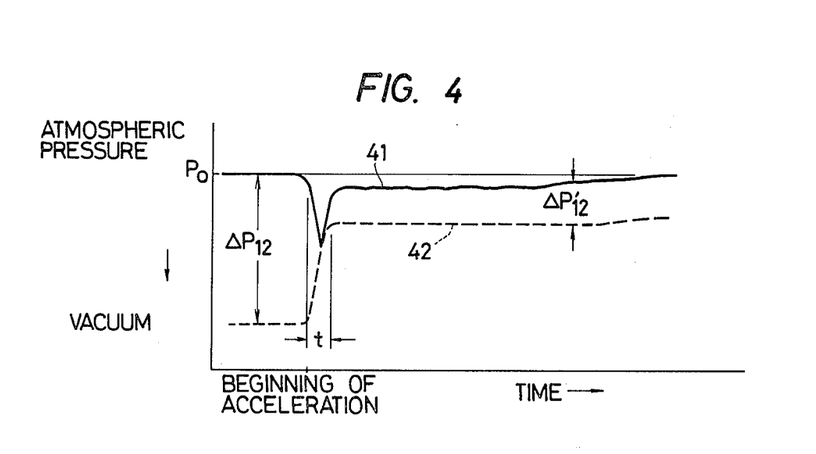
FIG. 4 is a diagrammatic illustration of control characteristics of the shift control valve of the present invention under an acceleration condition.

Operation of the engine 1 under acceleration and deceleration will be explained in more detail with reference to FIGS. 4 and 5. More particularly, FIG. 4 provides an example of the control characteristics of the control system for the present invention during an acceleration of the engine. In this connection, the solid line designated by the numeral 41 illustrates a pressure $P_{A1}$ upstream of the throttle valve 29 with the broken line designated by the reference numeral 42 representing the compressor inlet pressure $P_{C1}$. Before acceleration of the engine, since the opening angle of the throttle valve 29 is relatively small, the differential pressure $\Delta P_{12}$, i.e., $(P_{A1} - P_{C1})$ is, as shown in FIG. 4, great. Accordingly, a force acts on the diaphragm 25 in the left hand direction in FIG. 1 to open the bypass valve 7. Next, entering into the acceleration operation of the engine 1, the throttle valve 29 begins to open and the pressures $P_{A1}$ and $P_{C1}$ vary in such directions that the differential pressure between these pressures become relatively small. After a time period t, a differential pressure $\Delta P'_{12}$ is less than $\Delta P_{12}$, which is eventually smaller by an amount $P_t$. Accordingly, the bypass valve 7 which has been opened is actuated or moved to a closed position so that the exhaust gas is fed onto the turbine 4 so as to initiate an operation of the turbocharger.

Figure 5:
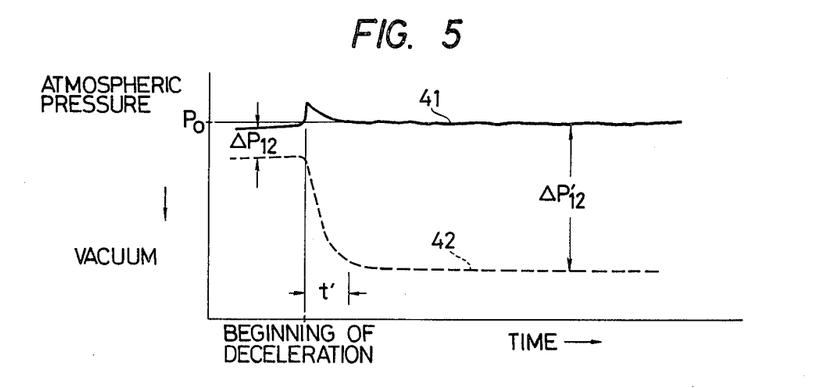
FIG. 5 is a diagrammatic illustration of control characteristics of the shift control valve of the present invention under deceleration conditions.

FIG. 5 provides an illustration of the control characteristics of the control system of the present invention under decelerating conditions. More particularly, before deceleration, since an opening degree of the throttle valve 29 is relatively great, the differential pressure $\Delta P_{12}$ between the pressure $P_{A1}$ and $P_{C1}$ is not great. Accordingly, as noted above, the force acting on the diaphragm 25 is small; therefore, the bypass valve 7 tends to be closed. Upon entering the deceleration operation of the engine 1, since the opening degree of the throttle valve 29 decreases, the pressures $P_{A1}$ and $P_{C1}$ varies so that the differential pressure therebetween becomes $\Delta P'_{12}$ which is $> \Delta P_{12}$ after a time period t'. Accordingly, the bypass valve 7 which has been closed is actuated by the force due to the differential pressure $\Delta P'_{12}$ to open the bypass passage 12.

The time period t and t', after which the bypass valve 7 begins the opening or closing operation under the acceleration or deceleration operation of the engine change in length depending upon the manner in which the acceleration and deceleration is executed. Namely, the more rapidly the acceleration and deceleration, the shorter is the time period and vice versa.

Figure 6:
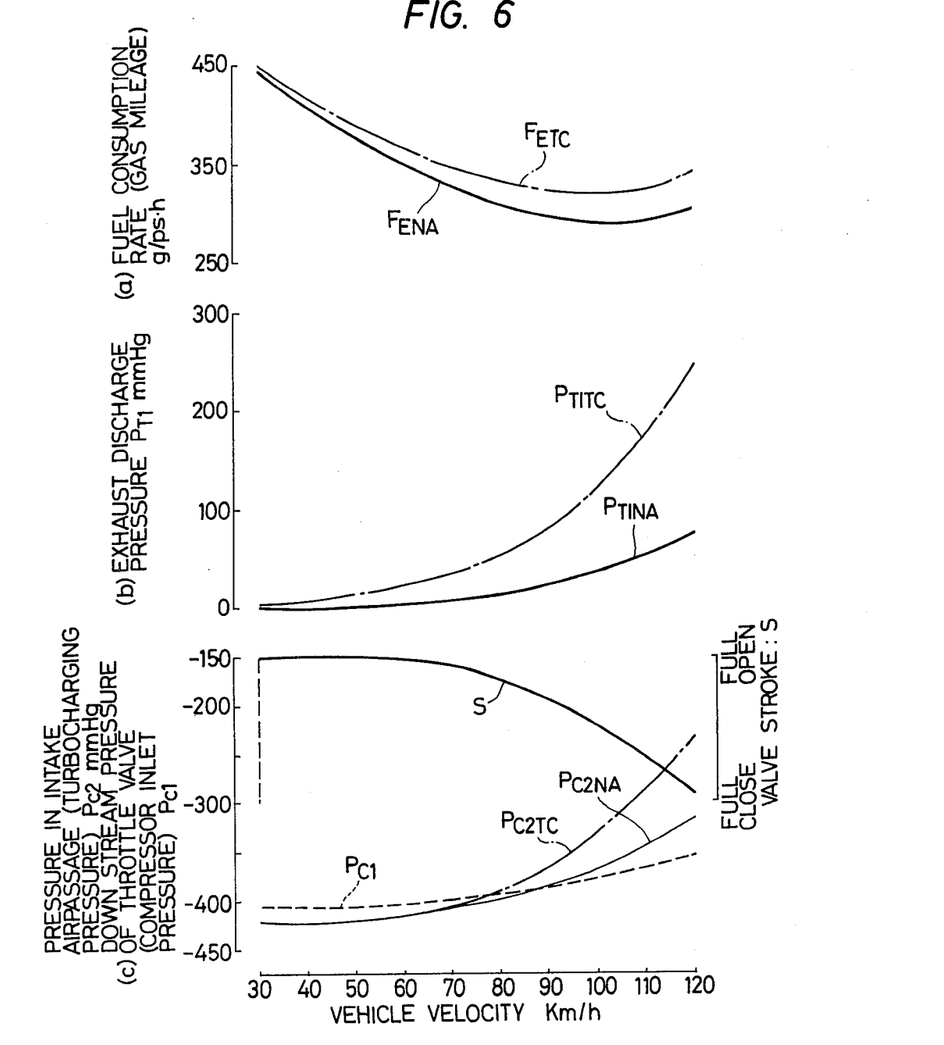
FIG. 6 is a diagrammatic illustration depicting the characteristics of a turbocharged engine having a control system in accordance with the present invention in comparison with a prior art turbocharged engine.

FIG. 6 provides an explanation of the operation of the bypass valve 7 under a low load condition. More particularly, FIG. 6 provides comparative examples of characteristics of two engines of the same engine displacement against the velocity of a vehicle under a road load condition, i.e., respective pressures, fuel consumption rate or gas mileage, and stroke of the bypass valve 7. As shown in FIG. 6, by the exhaust discharge pressure characteristic in the drawing, the characteristic $P_{T1TC}$ of the turbocharged engine, hereinafter called PC engine, lies above the characteristic $P_{T1NA}$ of a natural aspirated engine, hereinafter called NA engine, by an amount responsive to the turbine 4 provided in the exhaust pipe 2. As is shown by the pressures $P_{C2NA}$ and $P_{C2TC}$ in the air intake passage 10 at this time, there is no great difference up to about 90 km/h. Further, with respect to the fuel consumption rates or gas mileages $F_{ENA}$ and $F_{ETC}$ indicating economy of the engine performance with identical engine displacement, the NA engine is superior to the TC engine. This is because the loss due to the increase of the exhaust discharge pressure; therefore, in such a region where the turbocharging effect is low, decrease of the exhaust discharge pressure by opening the bypass valve 7 results in an improvement of the fuel consumption rate or gas mileage. Namely, as noted above, by leading the atmospheric pressure $P_O$ in the compressor inlet pressure $P_{C1}$ into the respective pressure chambers 200 and 202 by means of the detection device 27 and shift control valves 201 and 204, the bypass valve 7 is opened.

The broken line in FIG. 6 represents the compressor inlet pressure $P_{C1}$ under a road load condition. The vacuum valve of the inlet pressure $P_{C1}$ at the illustrated point in time is in the vicinity of about $-400$ mmHg. The differential pressure between the pressure $P_{C1}$ fed or supplied to the second pressure chamber and the atmospheric pressure $P_O$ fed into the first pressure chamber 200 reaches about 400 mmHg. In the example shown in FIG. 6, when the vehicle velocity is greater than about 70 Km/h, the pressure $P_{C1}$ becomes greater than the preset pressure 400 mmHg to prevent the above noted overcharging by the turbocharger; therefore, the bypass valve 7 is actuated. Namely, it becomes possible, as shown in FIG. 6, to obtain a stroke characteristic designated by the reference character S. Accordingly, the respective pressure characteristics $P_{T1TC}$ and $P_{C2TC}$ of the TC engine become nearly equal to those of the NA engine in value and the fuel consumption rate or gas mileage is also changed so as to be near that of the NA engine. In this manner, the bypass valve 7 operates to decrease the discharge loss when the differential pressure between the vacuum and the atmospheric pressure is greater than the preset pressure; therefore, the time when the pressures are fed into the first and second pressure chambers 200 and 202 are to be shifted, can be varied by presetting the pressure $P_A$ at any value within the limits of $+400$ to $-400$ mmHg over the atmospheric pressure $T_O$.

However, from a viewpoint of expanding the control range of the bypass valve 7 and also for stability in operation of the bypass valve the time when the control pressures are to be shifted, it is preferable that the preset pressure $P_A$ lies at a value near a $+400$ mmHg, for example, within a limit or range of from 0 to 280 mmHg.

While a construction described hereinabove proposes using two shift control valves 201 and 204, it is also possible to obtain the same effect by using a magnetic valve of the type illustrated, for example, in FIG. 7, wherein the magnetic valve is provided with three pressure inlets 701, 704, and 705 and two pressure outlets 702, 703. As shown in FIG. 7, the magnetic valve is composed of cylinder 710, a piston 712, formed as a unit with a magnetic portion 714, a magnetic coil 716, a spring 718, and lead lines 307, 308 connected to an output terminal 310 of a contact switch and an electrical source 311. The pressure detection device 27, to which is fed the turbocharging pressure $P_{C2}$ from the intake air passage 10, performs the switching operation upon the attainment of a desired preset pressure. Accordingly, the on/off operation of the detection device 27 controls, through the lead lines 307, 308 excitation of the coils 716 and disposition of the piston 712, so as to enable the piston 712 to carry out a shifting of pressure from the respective inlet passages of the cylinder 710 to the respective pressure outlets.

The control valve of FIG. 7 operates in the following manner. If the turbocharging pressure $P_{C2}$ is greater than a value of a preset pressure $P_A$, and current flows through the detection device 27 into the coil 716, the piston 712 within the cylinder 710 is pulled to the right of FIG. 7 so that the pressure inlet passages 701 and 704 are connected through passages 7121 7122 to the outlet 703 and 702, respectively. Atmospheric pressure $P_O$ from upstream of the throttle valve 29 is fed to the inlet passage 701 through, for example, the tubes or lines 209 and 211 (FIG. 1), with the turbocharging pressure $P_{C2}$ in the intake air passage 10 being fed to the inlet passage 704 through the tubes or lines 208, 207 (FIG. 1). Therefore, the first pressure chamber 200 is acted upon by the turbocharging pressure $P_{C2}$ and the second pressure chamber 202 is acted upon by the atmospheric pressure $P_O$. When the differential pressure between the turbocharging pressure $P_{C2}$ and the atmospheric pressure $P_O$ is greater than the value of the preset pressure $P_A$, the bypass valve 7 is opened to prevent an increase in the rotational speed of the turbine 4.

On the other hand, if the turbocharging pressure $P_{C2}$ is less than the value of the preset pressure $P_A$, the switch of the pressure detection device 27 opens to cut off the current flowing through the coil 716. The piston 712 is pushed to the left of FIG. 7 by the reactive force of the spring 718 so thereby the first pressure chamber 200 is connected to the inlet passage 701 through the passage 7121 and is subjected to the atmospheric pressure $P_O$. The second pressure chamber 202 is then connected to the inlet passage 705 through the passage 7122 and is acted upon or subjected to the compressor inlet pressure $P_{C1}$. If the differential pressure between $P_O$ and $P_{C1}$, that is, $(P_O-P_{C1})$ is greater than the value of the preset pressure $P_A$, then the bypass valve 7 is closed in the same manner as described hereinabove in connection with the construction of FIGS. 1 and 2.

As apparent from the above, the turbocharged internal combustion engine with the control system of the present invention favorably effects the operation of the engine.

While I have shown and described only two embodiments in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A turbocharger control system for an internal combustion engine having an exhaust gas turbocharger means including a compressor means, a turbine means, a throttle valve means for controlling a flow of intake air into the engine, and a bypass valve means for enabling a bypass of the turbine means by exhaust gases of the engine thereby controlling a speed of the turbine means, characterized in that the throttle valve means is disposed upstream of the compressor means, a pressure means is connected to the bypass valve means for controlling a positioning thereof, the pressure means includes a first pressure chamber means and a second pressure chamber means separated from the first pressure chamber means by a diaphragm means, means are provided for supplying the first pressure chamber means with a turbocharging pressure existing between the compressor means and an intake manifold of the engine and for supplying the second pressure chamber means with atmospheric pressure, means are provided for detecting the turbocharging pressure and comparing the detected pressure with a preset value, and in that control means are provided for applying the atmospheric pressure to the first pressure chamber means and applying a pressure existing between the throttle valve means and the compressor means to the second pressure chamber means in dependence upon an output signal from the detecting means when the turbocharging pressure is less than the preset value.

2. A turbocharger control system according to claim 1, characterized in that the turbocharging means is arranged between the throttle valve means and intake manifold of the engine, and the turbine means is arranged in a exhaust line of the engine.

3. A turbocharger control system according to one of claims 1 or 2, characterized in that the preset value of the detecting means is within the range of 0–280 mmHg.

4. A turbocharger control system according to claim 3, characterized in that the control means includes two three-way shift valves.

5. A turbocharger control system according to claim 4, characterized in that each shift valve is a magnetic valve including a coil means.

6. A turbocharger control system according to claim 3, characterized in that the control means includes a five-way shift valve.

7. A turbocharger control system according to claim 3, characterized in that the detecting means includes a diaphragm cooperable with an electric switch.

8. A turbocharger control system for an internal combustion engine having an exhaust gas turbocharging means including a compressor means, a turbine means, a throttle valve means for controlling a flow of intake air into the engine, and a bypass valve means for enabling a bypass of the turbine means by exhaust gases of the engine thereby controlling a speed of the turbine means, characterized in that the throttle valve means is disposed upstream of the compressor means, a pressure means is connected to the bypass valve means for controlling a positioning thereof, the pressure means including a first pressure chamber means and a second pressure chamber means separated from the first pressure chamber means by a diaphragm means, control means for controlling a supply of pressure to said first and second pressure chamber means including first and second three-way control valve means each comprising a first compressor pressure inlet, a second atmospheric pressure inlet, and a valve portion means, sensing means for sensing at least first and second magnitudes of an output pressure of said compressor means, and means for actuating of the valve portion means of said first and second three-way control valve means in response to said first magnitude of output pressure of said compressor means to communicate the output pressure to said first pressure chamber means and atmospheric pressure to said second pressure chamber means and in response to said second magnitude of output pressure of said compressor means to communicate atmospheric pressure to said first pressure chamber means and input pressure of said compressor means to said second pressure chamber means.

9. A turbocharge control system for an internal combustion engine having an exhaust turbocharging means including a compressor means, a turbine means, a throttle valve means for controlling a flow of intake air into the engine, and a bypass valve means for enabling a bypass of the turbine means by exhaust gases of the engine thereby controlling a speed of the turbine means, characterized in that the throttle valve means is disposed upstream of the compressor means, a pressure means is connected to the bypass valve means for controlling a positioning thereof, the pressure means includes a first pressure chamber means and a second pressure chamber means separated from the first pressure chamber means by a diaphragm means, control means for controlling a supply of pressure to said first and second pressure chamber means including three-way valve control means comprising a first compressor pressure inlet, a second atmospheric pressure inlet and a valve portion means, a sensing means to sense at least first and second magnitudes of an output pressure of said compressor means, means for actuating the valve portion means in response to one of said magnitudes of the output pressure of the compressor means to communicate atmospheric pressure through the second atmospheric pressure inlet to one of said first and second pressure chamber means and to communicate one of an input pressure of said compressor means and the output pressure of said compressor means through said compressor pressure inlet to the other of said pressure chamber means.

10. A turbocharger control system as set forth in claim 9, wherein said second atmospheric pressure inlet is in communication with said second pressure chamber means when said output pressure of said compressor means is in communication with said first pressure chamber means.

11. A turbocharger control system as set forth in claim 9, wherein said second atmospheric pressure inlet is in communication with said first pressure chamber means when the input pressure of said compressor means is in communication with said second pressure chamber means.

12. A turbocharger control system for an internal combustion engine having an exhaust gas turbocharging means including a compressor means, a turbine means, a throttle valve means for controlling a flow of intake air into the engine, and a bypass valve means for enabling a bypass of the turbine means by exhaust gases of the engine thereby controlling a speed of the turbine means, characterized in that the throttle valve means is disposed upstream of the compressor means, a pressure means is connected to the bypass valve means for controlling a positioning thereof, the pressure means including a first pressure chamber means and a second pressure chamber means separated from the first pressure chamber means by a diaphragm means, control means for controlling a supply of pressure to said first and second pressure chamber means including a five-way control valve comprising a first atmospheric pressure inlet, a second compressor input pressure inlet and a third compressor output pressure inlet, first pressure outlet and second pressure outlet and a valve portion means, sensing means for sensing at least a first and second magnitude of an output pressure of said compressor means, means for actuating the valve portion means for said first magnitude of output pressure of said compressor means to communicate atmospheric pressure through the atmospheric pressure inlet to the second pressure chamber means and to communicate output pressure of the compressor means through the compressor output pressure inlet to the first pressure chamber means and for said second magnitude of output pressure of said compressor means to connect said atmospheric pressure to the first pressure chamber means and to communicate input pressure of said compressor means through the compressor input pressure inlet to the second pressure chamber means.

13. A turbocharger control system as set forth in claim 12, wherein the valve portion means comprises a first channel in communication with said atmospheric pressure inlet for supplying pressure to one of said pressure chamber means.

14. A turbocharger control system as set forth in claim 12, wherein said valve portion means comprises a second channel means for communicating the input pressure of said compressor means to said second pressure chamber means when said atmospheric pressure is applied to said first pressure chamber means.

15. A turbocharger control system as set forth in claim 12, wherein said valve portion means comprises a third channel means for communicating the output pressure of said compressor means to said first pressure chamber means when said atmospheric pressure is applied to said second pressure chamber means.

16. A turbocharger control system as set forth in one of claims 8, 9 or 12, wherein said means for actuating the valve portion means comprises a magnetic coil means responsive to the output pressure of said compressor means.

* * * * *